3,057,790
SELECTIVE HYDROGENOLYSIS
Alexander MacLachlan, Wilmington, Del., assignor to
E. I. du Pont de Nemours and Company, Wilmington,
Del., a corporation of Delaware
No Drawing. Filed May 18, 1960, Ser. No. 29,799
5 Claims. (Cl. 204—154)

This invention is concerned with a new method of selective hydrogenolysis, and more particularly with the hydrogenolysis of selected ester linkages by means of ionizing radiation.

In the preparation of pharmaceuticals and synthetic polymers of improved dye receptivity, critical desired structures often require the presence of free carboxylic acid groups and esterified carboxylic acid groups in the same molecule. Syntheses for ester-containing substances usually involve an intermediate step in which all acid groups are esterified. No convenient method has heretofore been available for converting certain ester groups in such substances to free acid groups while other ester groups are left undisturbed. The present invention provides such a method. In addition, the method of this invention is applicable to very complex organic structures, such as steroid-type compounds, for example, thereby affording a method of obtaining steroid products by hydrogenolysis of ester linkages.

There has now been discovered a process for the selective hydrogenolysis of arylmethyl esters to the corresponding free acids and substituted ethanes by the action of ionizing radiation in the presence of a hydrogen-containing reaction medium.

Generally, the process of this invention consists of the selective hydrogenolysis of arylmethyl esters of the type represented by the formula $RCOOCR_2'R''$, where R is hydrogen, a monovalent hydrocarbon radical or a monovalent organic radical having the bond connecting with the carboxyl group stemming from a carbon atom, R' is hydrogen or an alkyl or aryl group, one of which may be the same as, or different from, the other, and R'' is a monovalent aryl hydrocarbyl radical, comprising irradiating the ester with ionizing radiation having an energy equivalent above about 32 electron volts in a solvent capable of supplying hydrogen.

The process of this invention can be illustrated by the equation:

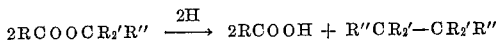

$$2RCOOCR_2'R'' \xrightarrow{2H} 2RCOOH + R''CR_2'-CR_2'R''$$

where R and R' are as hereinbefore defined and R'' is a monovalent aryl hydrocarbyl radical, particularly phenyl, naphthyl, anthryl, and the like.

Th presence of a reaction medium containing combined hydrogen is essential to the success of this invention. It is postulated that the hydrogen absorbed in the hydrogenolysis step is abstracted from the reaction medium by the action of the ionizing radiation. A typical example is benzyl acetate dissolved in cyclohexane. Here the products, acetic acid and bibenzyl, are readily separated from the resulting mixture containing these materials along with unchanged benzyl acetate and degradation products resulting from the action of the ionizing radiation.

The reaction medium in which this invention is carried out must be capable of penetrating to all parts of the arylmethyl ester and is preferably a solvent therefor. Suitable media include hydrocarbons, e.g., benzene, toluene, xylene, ethylbenzene, cyclohexane, cyclohexene, pentane, octane, decalin, and the like; ketones, e.g., acetone, methyl ethyl ketone, and the like; esters, e.g., methyl acetate, ethyl acetate, ethyl butyrate, and the like; and ethers, e.g., dimethyl ether, diethyl ether, di-n-butyl ether, and the like. The hydrocarbons and the alcohols represent a preferred class of reaction media.

The acid moiety of the arylmethyl esters which are operable in the present invention may be any carboxyl-bearing organic material. Since the carboxyl group is the only one involved in the reaction, the specific constitution of the remainder of the molecule is immaterial. Thus, R in the general formula set forth may be, for example, hydrogen, as in benzyl formate, a hydrocarbon, as in one of the benzyl esters derived from some of the common carboxylic acids such as benzyl acetate, benzyl stearate, benzyl benzoate, and the like, or a highly complex radical, as, for example, a polyacrylate bearing side chain with pendent carboxylic groups esterified with benzyl alcohol.

The temperature at which the reaction of this invention can be carried out covers a wide range, so long as it does not exceed the temperature at which the acid being formed is decarboxylated by loss of carbon dioxide. Loss of the product acid by decarboxylation is particularly to be avoided, and, for this reason, temperatures below about 100° C., and even better below about 25° C., are especially desirable if decarboxylation becomes a problem.

Pressure has little effect on the process of this invention, and pressures both above and below atmospheric level are operable. Atmospheric pressure is, however, preferred for convenience.

The concentration of the arylmethyl ester in the reaction mixture being exposed to ionizing radiation can vary from mere traces, demonstrable only by chromatography or similar delicate identification techniques, to relatively large amounts. For the economic preparation of free acids by the process of this invention, it is preferred that the arylmethyl ester be present at from about 0.001 to about 10 molar concentration in the mixture which is irradiated. Concentrations of arylmethyl ester from 0.1 to 2.0 molar constitute a particularly preferred range.

By "ionizing radiation" is meant radiation having sufficient energy to remove an electron from a gas atom, forming an ion pair; this requires an energy of about 32 electron volts (ev.) for each ion pair formed. This radiation has sufficient energy to break chemical bonds; thus, in round numbers radiation with energy of 50 electron volts (ev.) and above is effective for the process of this invention, although energies of 100 ev. and over are preferred, as within the capabilities of available generating equipment together with improved penetration. The ionizing radiation of the process of this invention is conventionally classified into two types: high-energy particle radiation, and ionizing electromagnetic radiation. The effect produced by these two types of radiation is the same, the essential requisite being that the incident particles or photons have sufficient energy to break chemical bonds and generate free radicals.

The preferred radiation for the practice of this invention is high energy ionizing particle radiation. For maximum utility from the standpoint of penetration, when using this type of radiation, energy equivalent to at least 0.02 million electron volts (mev.) is preferred. Higher energies are even more effective, in that thicker layers of material can be irradiated, and there is no known upper limit, except that imposed by available equipment.

By "particle radiation" is meant a stream of particles such as electrons, protons, neutrons, alpha-particles, deuterons, beta-particles, or the like, so directed that the said particle impinges upon the arylmethyl ester composition. The charged particles can be accelerated by application of a suitable voltage gradient, employing devices such as a cathode-ray tube, resonant cavity accelerator, a Van de Graaff accelerator, a Cockcroft-Walter accelerator, or the like, as is well known to those skilled in the art.

Neutron radiation can be produced by suitable nuclear reactions, e.g., bombardment of a beryllium target with high velocity deuterons or alpha-particles. In addition, particle radiation suitable for carrying out the process of this invention is also obtainable from an atomic pile, from radioactive isotopes or from other sources.

By "ionizing electromagnetic radiation" is meant photons of the type produced when a metal target (e.g. gold or tungsten) is bombarded by electrons possessing appropriate energy. Such radiation is conventionally termed X-ray. In addition to X-rays produced as indicated above, ionizing electromagnetic radiation suitable for carrying out the process of the invention can be obtained from a nuclear reactor ("pile"), or from natural or artificial radioactive material. In all of these latter cases the radiation is conventionally termed gamma rays.

It is convenient to specify both particle radiation and electromagnetic ionizing radiation by reference to a common scale of energy equivalents. On this basis, any radiation which has the energy equivalent of a beam of electrons each having an energy of at least 0.0001 mev. (million electron volts) is suitable for the process of this invention. Radiation with energy equivalent to a beam of electrons of 0.0001 to 0.1 mev. energy is preferred where radiation of this energy is available at low cost and where time is not a primary factor in the conduct of the process. Radiation with energy equivalent to a beam of electrons of 0.1 mev. and over (i.e., 0.1 mev. up to 2 to 5 mev.) is preferred where the cost of the higher intensity radiation is offset by the corresponding saving in exposure time. This is particularly true in continuous operation. Radiation with even higher energies (i.e., 5 mev. and higher) can also be employed where practicable.

The dosage, or total quantity, of radiation absorbed by the arylmethyl ester in the process of this invention should be at least 100 rads to produce useful amounts of free acid. Dosages in excess of $10^4$ rads are preferred. The unit, one rad, is the quantity of radiation which results in an energy absorption of 100 ergs/gram of irradiated material.

The process of this invention is characterized by a G (acid) yield in excess of one. The unit G (acid) is the number of molecules of free acid produced for each 100 electron volts of energy absorbed.

In the preferred practice of this invention, an arylmethyl ester, such as a benzyl ester dissolved in about 0.1 M concentration in an organic solvent, such as an alkanol, is subjected to ionizing radiation until substantially none of the ester remains. The free acid and arylethane formed by the hydrogenolysis are separated by known means. For example, the acid can be recovered in the form of its alkali metal salt, followed by acidification to regenerate the acid. The arylethane is conveniently separated by distillation.

The hydrogenolysis of this invention is quantitatively related to the radiation effecting the hydrogenolysis, so that it is possible, with appropriate calibration, to determine absorbed radiation as a function of the acidity developed in the irradiated substance, thereby providing a chemical dosimeter wherein radiation can be measured by direct titration with alkali, or in other ways.

In the following examples parts are by weight unless otherwise indicated.

EXAMPLE I

In a glass container covered with 0.0015″ aluminum foil a solution of about 30 parts of dibenzyl succinate in about 750 parts of cyclohexane (0.1 M solution) was irradiated at room temperature with 2 mev. electrons derived from a resonant transformer operated at one milliampere. Irradiation entered through the aluminum foil, and 0.8 watt-sec./cm.$^2$ of radiation was applied over a period of two minutes. The dosage was $5.4 \times 10^6$ rads. A solid precipitate of succinic acid (melting point 184–187° C.) was recovered by filtration.

EXAMPLE II

A demonstration of the unique specificity of my process is the following:

In the apparatus of Example I, a solution of about 61 parts of benzy ethyl succinate in 1948 parts of cyclohexane was irradiated at room temperature, using 2 mev. electrons derived from a resonant transformer operated at one milliampere with a flux of 1.14 watt-sec./cm.$^2$. In the course of seven minutes, a dose of 17.2 megarads was delivered. The irradiated solution was divided into two portions. A first portion was extracted three times with aqueous sodium bicarbonate. The basic aqueous extract was then washed two times with ether and the washings discarded, following which it was acidified with dilute hydrochloric acid and extracted five times with diethyl ether. The five ether extract portions were combined, dried over anhydrous calcium sulfate, and evaporated to dryness to yield β-carbethoxypropionic acid. The identity of this acid was confirmed, and the absence of any other acid verified, by infrared spectroscopy. Titration of the second portion of the solution described showed a $G_{(acid)}$ yield of 2.4. The formation of β-carbethoxypropionic acid solely, rather than the alternative acid, demonstrates the high degree of specificity of the reaction.

EXAMPLE III

The process of Example II was repeated in the irradiation of a solution of 50 parts of benzyl cholate in 810 parts of cyclohexene. A flux of 1.19 watt-sec./cm.$^2$ was applied over a period of ten minutes to deliver a total dose of 25.9 megarads. The product was then worked up as in Example II and shown by infrared spectroscopy to be the pure steroid cholic acid.

EXAMPLE IV

In a glass container covered with 0.0015″ aluminum foil, a solution of about 15 parts benzyl acetate in about 750 parts cyclohexane (0.1 M solution) was irradiated at room temperature with 2 mev. electrons from a resonant transformer operating at one milliampere. Irradiation entered through the aluminum foil and 0.7 watt-sec./cm.$^2$ of radiation was applied over a period of five minutes. The dose was $5.95 \times 10^6$ rads. The acetic acid produced was determined by titration with 0.02 M sodium hydroxide solution, and by gas-liquid chromatography and the $G_{(acid)}$ yield found to be 2.2

The following additional examples were carried out by the process of Example II, using the indicated starting materials and dosages of electrons to produce the reported products. Initial concentrations of ester in the starting reaction media were all 0.1 M.

| Example | Ester | Reaction Medium | Dose (Megarads) | Product | $G_{(acid)}$ |
|---|---|---|---|---|---|
| V | benzyl acetate. | ethanol | 10.5 | acetic acid | 2.5 |
| VI | benzyl butyrate. | cyclohexane | 7.2 | butyric acid | 1.9 |
| VII | benzyl isobutyrate. | ___do___ | 10.8 | isobutyric acid. | 1.67 |
| VIII | benzyl benzoate. | ___do___ | 11.5 | benzoic acid | 1.03 |
| IX | benzyl cholate. | cyclohexene | 9.5 | cholic acid | 1.8 |
| X | ___do___ | ___do___ | 14.1 | ___do___ | 1.95 |
| XI | α-naphthyl-methyl acetate. | cyclohexane | 12.5 | acetic acid | 1.27 |

The specificity of my irradiation hydrogenolysis for arylmethyl esters is shown by the following comparative tests. Here irradiations were conducted (table) using the process of Example II on the several indicated solutions of individual esters of the non-arylmethyl type at 0.1 M concentration in cyclohexane. The acids reported were obtained in very small amounts, as confirmed by the $G_{(acid)}$ values, and do not approach the readings of 1.0 and above which are characteristic of the process of this invention.

*Table*

| Ester | Dose (Megarads) | Product | G(acid) |
|---|---|---|---|
| β-phenylethyl acetate | 13.8 | acetic acid | 0.084 |
| γ-phenylpropyl acetate | 12.4 | ___do___ | 0.16 |
| cyclohexyl acetate | 14.3 | ___do___ | 0.23 |
| cyclohezylmethyl acetate | 11.9 | ___do___ | 0.19 |
| phenyl acetate | 11.8 | ___do___ | 0.37 |
| phenyl benzoate | 12.8 | benzoic acid | 0.087 |

From the foregoing it will be understood that this invention may be modified in numerous respects without departure from its essential spirit and it is therefore intended to be limited only by the scope of the claims.

What is claimed is:

1. A process for the selective hydrogenolysis or arylmethyl esters represented by the formula $RCOOCR_2'R''$, where R is one of the group consisting of hydrogen, a monovalent hydrocarbon radical and a monovalent organic radical having the bond connecting with the carboxyl group stemming from a carbon atom, R' is one of the group consisting of hydrogen, an alkyl radical and an aryl radical and R'' is a monovalent aryl hydrocarbyl radical, comprising irradiating said ester with ionizing radiation having an energy equivalent above about 32 electron volts in an amount in excess of about 100 rads while contacting said ester with a liquid phase organic solvent for said ester containing combined hydrogen.

2. A process according to claim 1 wherein R is a steroid substituent.

3. A process according to claim 1 where $CR_2'R''$ is the benzyl radical ($CH_2C_6H_5$).

4. A process according to claim 1 wherein R'' is the naphthyl radical ($C_{10}H_7$).

5. A process according to claim 1 wherein R is a monovalent organic radical having the bond connecting with the carboxyl group stemming from a carbon atom and containing ester groups other than the aryl methyl type.

References Cited in the file of this patent

UNITED STATES PATENTS

| 2,751,406 | Ipatieff et al. | June 19, 1956 |
| 2,951,024 | D'Alelio | Aug. 30, 1960 |